(12) United States Patent
Inoue et al.

(10) Patent No.: US 8,817,503 B2
(45) Date of Patent: Aug. 26, 2014

(54) POWER CONVERTER WITH A CENTRAL CONTROLLER AND CELL CONTROLLERS DAISY-CHAINED BY OPTICAL FIBER

(75) Inventors: Shigenori Inoue, Hitachi (JP); Shuji Katoh, Hitachiota (JP); Tetsuya Kato, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 13/383,628

(22) PCT Filed: Jul. 13, 2010

(86) PCT No.: PCT/JP2010/061814
§ 371 (c)(1),
(2), (4) Date: Jan. 12, 2012

(87) PCT Pub. No.: WO2011/010575
PCT Pub. Date: Jan. 27, 2011

(65) Prior Publication Data
US 2012/0113698 A1    May 10, 2012

(30) Foreign Application Priority Data

Jul. 21, 2009  (JP) ................................. 2009-169687

(51) Int. Cl.
*H02M 7/25*    (2006.01)

(52) U.S. Cl.
USPC ............................................. 363/68; 363/127

(58) Field of Classification Search
CPC ........................ H02M 7/217; H02M 2001/007
USPC ...................................... 363/67, 68, 127, 132
See application file for complete search history.

(56) References Cited

U.S. PATENT DOCUMENTS 4,700,284 A * 10/1987 Yoshizumi et al. ............. 363/68
2004/0208029 A1  10/2004 Caruthers et al.
(Continued)

FOREIGN PATENT DOCUMENTS

CN   101478242    7/2009
JP   5-191966     7/1993
(Continued)

OTHER PUBLICATIONS

Office Action in Korean Patent Appln. KR10-2012-7001644, mailed Dec. 26, 2013 (3 pgs., in Korean) [reasons for rejection: Some of Claims are rejected over Ref. 1 and Ref. 2 as being lack of the inventive step.].

(Continued)

*Primary Examiner* — Jeffrey Sterrett
(74) *Attorney, Agent, or Firm* — Antonelli, Terry, Stout & Kraus, LLP.

(57) ABSTRACT

Disclosed is a power conversion device, wherein among the optical fiber cables used in control/communication, at least the majority of high-voltage optical fiber cables with a dielectric strength against the output voltages of a plurality of cells can be eliminated and thus a low-voltage optical fiber cable with a dielectric strength against the output voltage of one cell can be used. Furthermore, here, the length required for the optical fiber cable can be reduced. A controller of the power conversion device comprising a plurality of cascade-connected cells comprises a central controller, and a cell controller with the same potential as each cell, the cell controller being installed in the vicinity of each cell, wherein the central controller and each cell controller are daisy-chained using an optical fiber cable.

13 Claims, 14 Drawing Sheets

(56) References Cited

U.S. PATENT DOCUMENTS

| | | |
|---|---|---|
| 2008/0218320 A1* | 9/2008 | Jang .................... 340/310.12 |
| 2008/0310205 A1 | 12/2008 | Hiller |
| 2012/0113698 A1* | 5/2012 | Inoue et al. ............. 363/123 |
| 2013/0208519 A1* | 8/2013 | Yamamoto et al. ......... 363/67 |
| 2013/0223115 A1* | 8/2013 | Tsuchiya et al. .......... 363/68 |

FOREIGN PATENT DOCUMENTS

| | | |
|---|---|---|
| JP | 2001-237866 | 8/2001 |
| JP | 2006-109258 | 4/2006 |
| JP | 2009-519692 | 5/2009 |
| WO | WO 2007/033852 A2 | 3/2007 |
| WO | WO2009/087063 | 7/2009 |

OTHER PUBLICATIONS

Hagiwara, Makoto and Akagi, Hirofumi; PWM Control and Experiment of Modular Multilevel Converters (MMC), Transactions of the Institute of Electrical Engineers of Japan, D, vol. 128, No. 7, pp. 957-965.

Gemmell, B. et al; "Prospects of Multilevel VSC Technologies for Power Transmission", IEEE/PES Transmission and Distribution Conference and Exposition, 2008, pp. 1-16.

Office Action in Chinese Patent Appln, 201080030941.X, mailed Nov. 29, 2013 (9 pgs., in Chinese) [brief translation of Office Action, in English, 1 pg.].

\* cited by examiner

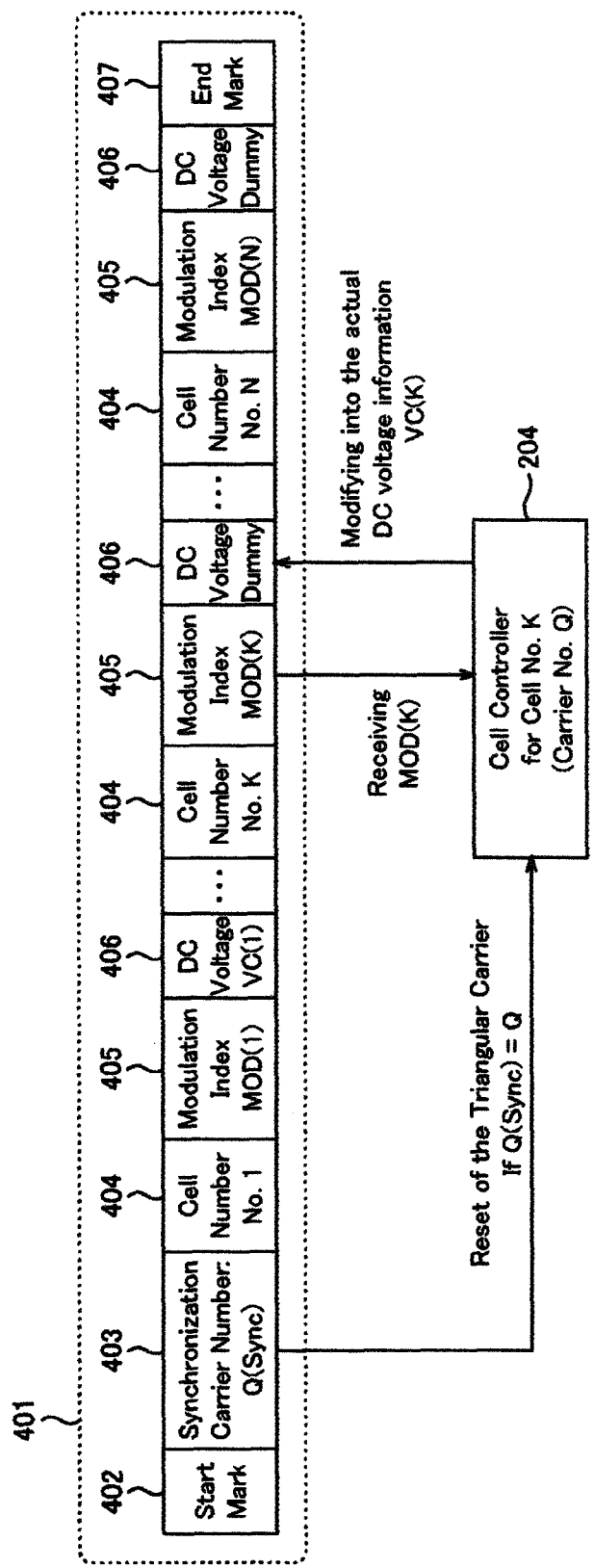

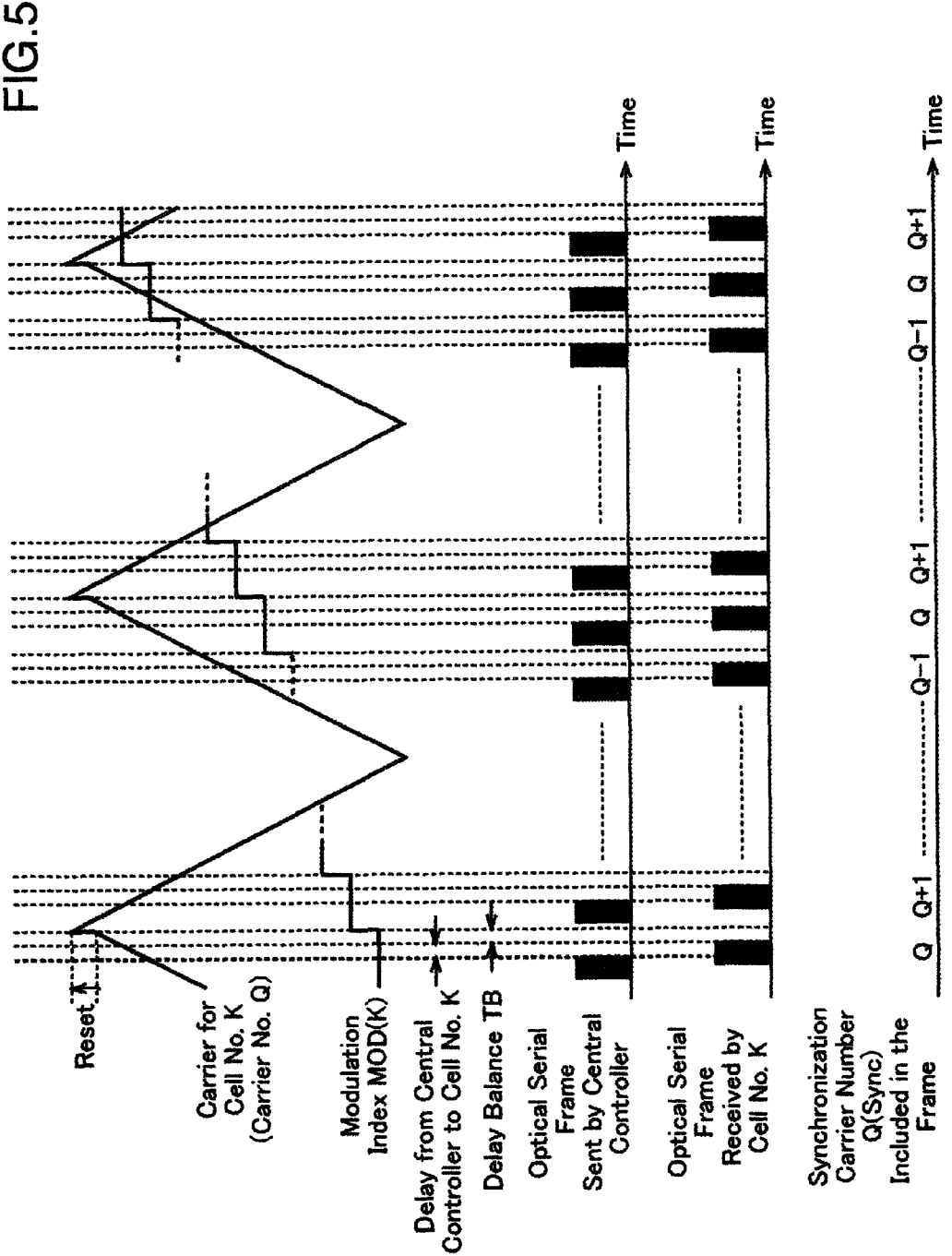

VOPT4 = VCELL4

POWER CONVERTER WITH A CENTRAL CONTROLLER AND CELL CONTROLLERS DAISY-CHAINED BY OPTICAL FIBER

TECHNICAL FIELD

The present invention relates to power conversion devices, and to the control/communication devices and communication optical fiber cables used therein.

BACKGROUND ART

A modular multilevel converter (MMC) comprising an on/off-controllable switching device, such as an insulated gate bipolar transistor (IGBT), is a converter capable of outputting a voltage exceeding a breakdown voltage of the on/off-controllable switching device. The MMC is promising in applications, such as a high voltage DC power transmission system (HVDC), a static compensator (STATCOM), and a motor drive inverter.

[Non Patent Literature 1] discloses a circuit system for the MMC.

According to Non Patent Literature 1, the MMC comprises a plurality of unit-converters (hereinafter, referred to as cells) serially-connected (cascaded). Each cell is a bidirectional chopper circuit, for example, and includes a switching device and a DC capacitor. Each cell is coupled to the outside via at least two terminals, and can control the voltage between the two terminals to a voltage of the DC capacitor which this cell includes, or to zero.

In PWM-control of each cell, by appropriately shifting the phase of a triangular waveform carrier supplied to each cell, the output voltage waveform of the MMC can be formed into a multilevel waveform. This can reduce the harmonic component as compared with the case of a two-level converter.

The features of the MMC include that the potential of each cell differs from each other and that there is a cell with a high earth potential. In particular, when the MMC is applied to HVDC or the like, the earth potential of a cell reaches several tens of kV to several hundreds of kV. In addition, the earth potential of each cell momentarily varies.

However, in Non Patent Literature 1, an isolation voltage between a controller and each switching device is not considered because the device at a laboratory level is targeted at.

Non Patent Literature 2 discloses a configuration, wherein a signal processing circuit with the same potential as each cell is mounted in the vicinity of the each cell, and wherein a central controller at the earth potential and each signal processing circuit are coupled to each other by an optical fiber cable.

CITATION LIST

Non Patent Literature

[NON PATENT LITERATURE 1] Makoto Hagiwara and Hirofumi Akagi: "PWM Control and Experiment of Modular Multilevel Converters (MMC)", Transactions of the Institute of Electrical Engineers of Japan. D, Vol. 128, No. 7, pp. 957-965

[NON PATENT LITERATURE 2] B. Gemmell, et al: "Prospects of multilevel VSC technologies for power transmission", IEEE/PES Transmission and Distribution Conference and Exposition, 2008, pp. 1-16

SUMMARY OF INVENTION

Technical Problem

Non Patent Literature 2 discloses a configuration, wherein from the central controller to one cell, at least one optical fiber cable is coupled. That is, from the central controller to each cell, the optical fiber cable is star-connected. Accordingly, in Non Patent Literature 2, at least the same number of optical fiber cables as the numbers of cells are needed.

In this case, all the optical fiber cables need to have a dielectric strength to withstand a potential difference between the central controller at the earth potential and each cell. That is, all the optical fiber cables need to be special optical fiber cables (hereinafter, referred to as high-voltage optical fiber cables) with a dielectric strength against creeping discharge and the like.

Note that a special sheath material needs to be used for the high-voltage optical fiber cable, resulting in a complexity of the manufacture process.

Furthermore, as with Non Patent Literature 2, when a controller and each cell are star-connected using an optical fiber cable, the length of each optical fiber becomes very long.

The present invention has been made in view of the above circumstances, and provides a power conversion device comprising a plurality of cascade-connected cells, wherein the required length of an optical fiber cable used for control/communication is shortened.

Solution to Problem

In order to achieve the above-descried objective, the present invention provides a power conversion device comprising a plurality of cascade-connected cells, wherein a controller of the power conversion device comprises a central controller, and a cell controller with the same potential as each cell, the cell controller being installed in the vicinity of the each cell, and wherein the central controller and each cell controller are daisy-chained using an optical fiber cable.

According to the present invention, in the power conversion device, the cell includes: a main circuit comprising on-off control switching devices and a DC capacitor; a DC voltage sensor detecting a voltage of the DC capacitor; a cell controller having a function to receive a signal from the central controller and generate a gate pulse of the on-off control switching devices and a function to transmit a signal from the DC voltage sensor to the central controller; a gate driver receiving the gate pulse from the cell controller and turning on/off the on-off control switching devices; and a boot-strap power supply supplying power to the cell controller and the gate driver.

According to the present invention, in the power conversion device, an optical fiber cable coupling the central controller and the cell controller to each other is an optical fiber cable with a dielectric strength against a sum of the voltages at output terminals of a plurality of cells.

According to the present invention, in the power conversion device, an optical fiber cable coupling the cell controllers of cascade-connected two cells is an optical fiber cable with a dielectric strength against the output voltage of one cell.

According to the present invention, in the power conversion device, an optical fiber cable coupling cell controllers of two cells, in which one of two terminals of the output terminal of one of the two cells and one of two terminals of the output terminal of the other cell are electrically coupled to each other, is an optical fiber cable with a dielectric strength against the output voltage of one cell.

According to the present invention, in the power conversion device, the optical fiber cable coupling the cell controllers of the cascade-connected two cells is supported by an electrical wiring between the cascade-connected two cells or by a member of the same potential as that of the electrical wiring.

According to the present invention, in the power conversion device, the optical fiber cable coupling cell controllers of two cells, in which one of two terminals of the output terminal of one of the two cells and one of two terminals of the output terminal of the other cell are electrically coupled to each other, is supported by an electric wiring cascade-connecting the two cells or by a member of the same potential as that of the electric wiring.

According to the present invention, in the power conversion device, the cell controller includes: a communication manager managing communication with the central controller; a modulation index buffer storing a modulation index for a main circuit therein, the modulation index being received from the central controller; a digital to analog converter converting an analog signal from the DC voltage sensor into a digital signal; a DC voltage buffer storing the digital signal therein; a triangular waveform carrier generator generating a triangular waveform carrier; and a gate pulse generator comparing the triangular waveform carrier with the modulation index stored in the modulation index buffer and generating a gate pulse supplied to the on-off control switching devices.

According to the present invention, in the power conversion device, the cell controller includes a timing controller issuing an operation timing command to the modulation index buffer, the triangular waveform carrier generator, and the gate pulse generator.

According to the present invention, in the power conversion device, the central controller transmits an optical serial signal frame comprising: a signal start mark; a synchronization carrier number; a series of signals comprising a modulation index signal with a cell number and a DC capacitor voltage dummy signal; and a signal end mark, at a substantially constant cycle.

According to the present invention, in the power conversion device, the cell controller receives the synchronization carrier number of the optical serial signal frame which is received via other cell controller daisy-chained from the central controller, and if the synchronization carrier number coincides with its own carrier number, the cell controller, when it has received the signal end mark included in the optical serial signal frame, resets the triangular waveform carrier generator via the timing controller.

According to the present invention, in the power conversion device, the cell controller receives the modulation index signal with a cell number included in the optical serial signal frame which is received via other cell controller daisy-chained from the central controller, and if the attached cell number coincides with its own cell number, the cell controller stores the received modulation index signal into the modulation index buffer.

According to the present invention, in the power conversion device, the cell controller receives the DC capacitor voltage dummy signal with a cell number included in the optical serial signal frame which is received via other cell controller daisy-chained from the central controller, and if the attached cell number coincides with its own cell number, the cell controller replaces the received DC capacitor voltage dummy signal with a signal stored in the DC voltage buffer.

Advantageous Effects of Invention

According to an aspect of the present invention, in a power conversion device comprising a plurality of cascade-connected cells, among the optical fiber cables used in control/communication, at least the majority of high-voltage optical fiber cables with a dielectric strength against a sum of the output voltages of a plurality of cells can be eliminated, allowing for the use of an optical fiber cable with a dielectric strength against the output voltage of one cell. Furthermore, a reduction of the length required for the optical fiber cable is achieved. The other purposes, features, advantages of the present invention become clear from the following description of the examples of the present invention in conjunction with the accompanying drawings.

BRIEF DESCRIPTION OF DRAWINGS

FIG. 4 shows an optical serial signal frame.

FIG. 5 shows an approach to synchronize a carrier of the Kth cell.

DESCRIPTION OF EMBODIMENTS

Figure 1:
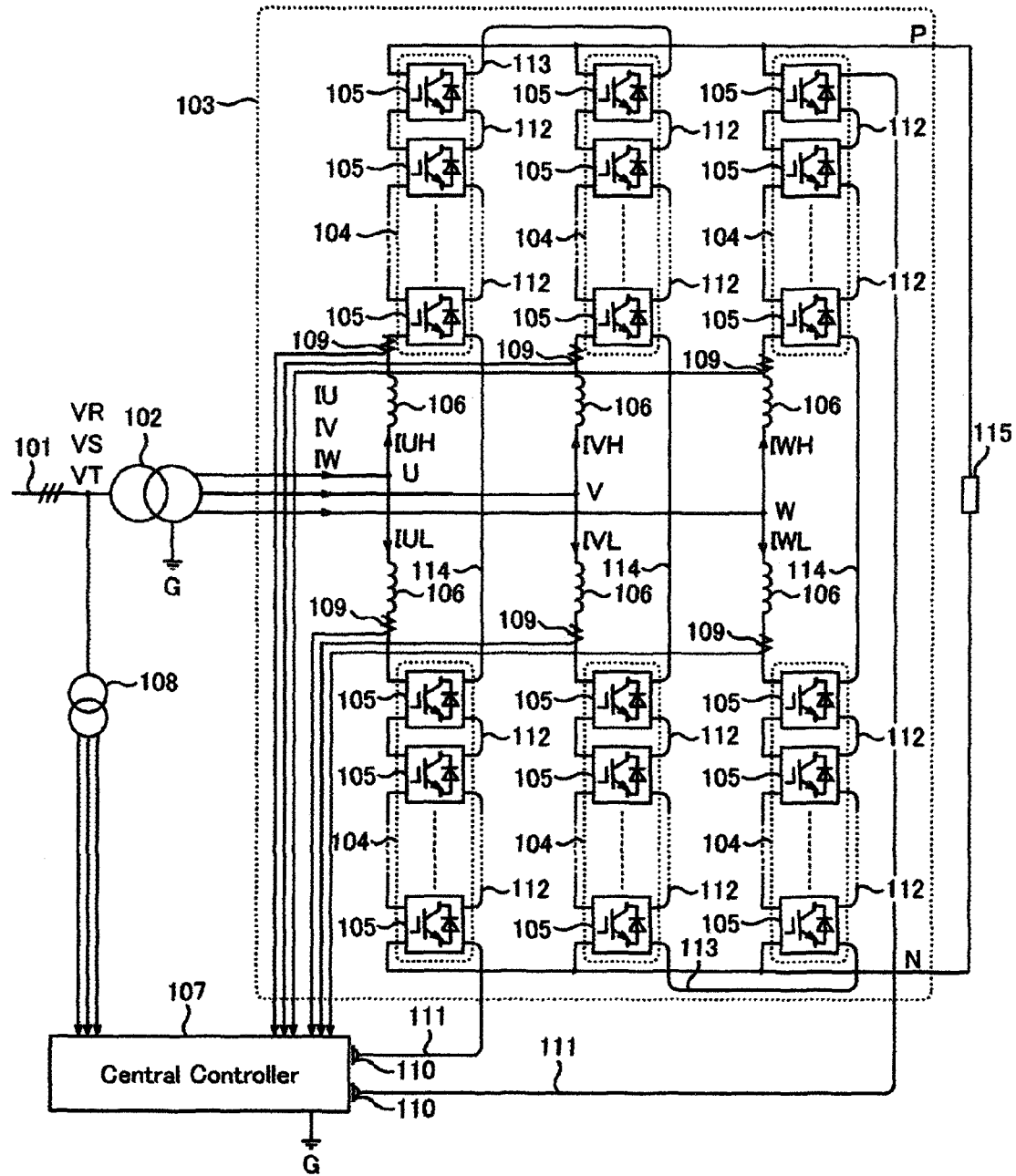
FIG. 1 shows an MMC, wherein all cells are daisy-chain connected using optical fiber cables.

Hereinafter, examples of the present invention will be described with reference to the accompanying drawings.
[Embodiment 1]

A first embodiment of the present invention is described.

In Embodiment 1, the number of high-voltage optical fiber cables required in Non Patent Literature 1, the number being at least the same number as the number of cells, can be reduced.

Hereinafter, the overall configuration of Embodiment 1 is described with reference to FIG. 1.

A power conversion device 103 is interconnected with a three-phase power system 101 via a transformer 102.

A point U, a point V, and a point W of the power conversion device 103 are coupled to the secondary side of the transformer 102. Moreover, a load device 115 is coupled between a point P and a point N of the power conversion device 103.

The power conversion device 103 in this example receives/supplies an AC power from/to the three-phase power system 101. Moreover, the power conversion device 103 receives/supplies a DC power from/to the load device 115. Here, the load device 115 represents a DC load, a DC link of a motor drive inverter, a DC power supply, or the like.

In this example, the phase voltages of the three-phase power system 101 will be referred to as VR, VS, and VT, respectively. Each phase current flowing on the secondary side of the transformer 102 will be referred to as IU, IV, and IW, respectively.

In this example, a neutral point on the secondary side (the side where the power conversion device 103 is coupled) of the transformer 102 is grounded.

In this example, a three-phase MMC interconnected with the three-phase power system is taken as the power conversion device 103. However, the present invention can be also applied to a single-phase MMC interconnected with a single-phase system, or an MMC driving a motor. Moreover, the present invention can be also applied to a CMC which will be described in Embodiments 3, 4.

The power conversion device 103 comprises a plurality of cells 105 cascade-connected.

Although the detail is described later, each cell 105 is a bidirectional chopper circuit with a DC capacitor (see FIG. 2). Each cell 105 is coupled to an external circuit via at least two terminals, wherein the voltage between the two terminals can be controlled to a DC capacitor voltage or zero.

In this example, the voltage between the two terminals will be referred to as an output voltage of a cell or a cell voltage.

As shown in FIG. 1, a circuit comprising one or more cells 105 cascade-connected will be referred to as a converter arm 104. In this example, assume that one converter arm 104 includes N cells 105. A current flowing through each converter arm 104 will be referred to as an arm current, and will be defined as IUH, IVH, IWH, IUL, IVL, and IWL as shown in FIG. 1.

The power conversion device 103 comprises six converter arms 104 and six reactors 106 coupled as shown in FIG. 1.

For the purpose of controlling the power conversion device 103, a central controller 107 is installed. The central controller 107 is at the earth potential represented by a point G in FIG. 1.

An AC voltage sensor 108 detects the system phase voltages VR, VS, and VT, and transmits their instantaneous value signals to the central controller 107.

Moreover, the current sensor 109 detects each arm current IUH, IVH, IWH, IUL, IVL, and IWL, and transmits their instantaneous value signals to the central controller 107.

The central controller 107 includes two optical transceivers 110, and communicates with each cell 105 via the optical transceivers 110.

The central controller 107 detects the system phase voltages VR, VS, and VT, the arm currents IUH, IVH, IWH, IUL, IVL, IWL, and a DC capacitor voltage VC of each cell 105, and determines, based on these pieces of information, a modulation index MOD to be transmitted to each cell 105, and transmits the modulation index MOD to each cell. The central controller 107 performs these series of operations at a substantially constant cycle. This cycle will be referred to as a control cycle.

By performing the above-described series of operations, the central controller 107 controls the arm currents IUH, IVH, IWH, IUL, IVL, and IWL, thereby controlling the power supplied/received to/from the three-phase power system 101. Moreover, the central controller 107 maintains the DC capacitor voltage VC of each cell 105 within an appropriate range.

The central controller 107 transmits the modulation index MOD to each cell 105 via the optical transceivers 110 and the optical fiber cables 111-114, and also receives the information about the DC capacitor voltage VC from each cell 105. The detail of the communication is described later.

In this example, all the cells 105 are daisy-chain connected using the optical fiber cables 111-114 from the central controller 107.

The optical fiber cable 111 coupling the cell 105 and the central controller 107 to each other is an optical fiber cable with a dielectric strength to withstand a sum of the output voltages of a plurality of cells.

The optical fiber cable 112 coupling two cells 105 adjacent in the same converter arm 104 is the optical fiber cable 112 with a dielectric strength to withstand the cell voltage of one cell.

The optical fiber cable 113 coupling two cells belonging to the different converter arms 104, the two cells coupling to the point P, is the optical fiber cable 113 with a dielectric strength to withstand the output voltage of one cell.

The optical fiber cable 113 coupling two cells belonging to the different converter arms 104, the two cells coupling to the point N, is the optical fiber cable 113 with a dielectric strength to withstand the output voltage of one cell.

The optical fiber cable 114 coupling two cells belonging to two converter arms 104 belonging to the same phase is an optical fiber cable with a dielectric strength to withstand a sum of the output voltages of a plurality of cells.

In this example, the optical fiber cables 111 and 114 will be referred to as a high-voltage optical fiber cable, respectively, and the optical fiber cables 112 and 113 will be referred to as a low-voltage optical fiber cable, respectively.

In FIG. 1, most of the optical fiber cables are the low-voltage optical fiber cables 112, 113, and there are only a total of five high-voltage optical fiber cables 111, 114.

Furthermore, the physical lengths of the low-voltage optical fiber cables 112, 113 can be reduced down to a length substantially equal to the physical size of the cell 105.

The reason why the low-voltage optical fiber cables 112, 113 can be employed will be described in detail after the description of each cell 105 and the description of a communication method.

Hereinafter, the configuration of the cell 105 is described with reference to FIG. 2.

The main circuit of the cell 105 is a bidirectional chopper circuit comprising a high-side switching device 201, a low-side switching device 202, and a DC capacitor 203. The voltage of the DC capacitor 203 will be denoted by VC.

The high-side switching device 201 and the low-side switching device 202 will be collectively referred to as a switching device.

In this example, the switching devices 201 and 202 are IGBTs, however the present invention can be also applied to the cases where the switching devices 201 and 202 are gate turn-off thyristors (GTO), gate-commutated turn-off thyristors (GCT), metal-oxide semiconductor field-effect transistors (MOSFET), or other on-off control devices.

Each cell 105 includes the cell controller 204, wherein the cell controller 204 is coupled to two optical transceivers 205 via the optical fiber cable 111, 112, 113 or 114.

The cell controller 204 generates gate pulses for the switching devices 201 and 202, and transmits the same to a gate driver 206.

The gate driver 206 applies an appropriate voltage to between the gate and emitter of the switching devices 201 and 202 to turn on or turn off the switching devices 201 and 202, respectively.

A DC voltage sensor 207 detects the DC capacitor voltage VC, and transmits its instantaneous value signal to the cell controller 204.

A boot-strap power supply 208 supplies power to the cell controller 204 and the gate driver 206.

Figure 2:
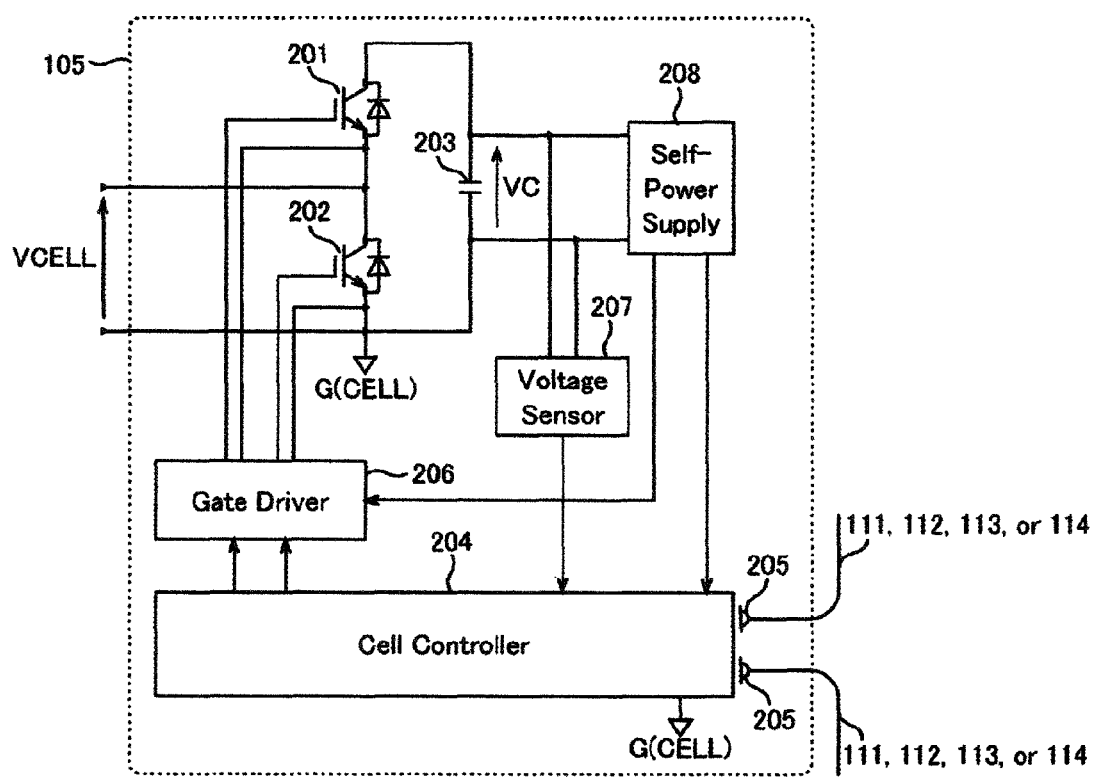
FIG. 2 shows a chopper cell.

The potential of each cell controller 204 is the same as that of the emitter terminal of the low-side switching device 202 of each cell, and this point is represents by a point G(CELL) in FIG. 2. Note that the point G(CELL) in FIG. 2 is a point of a potential different from the point G in FIG. 1.

Figure 3:
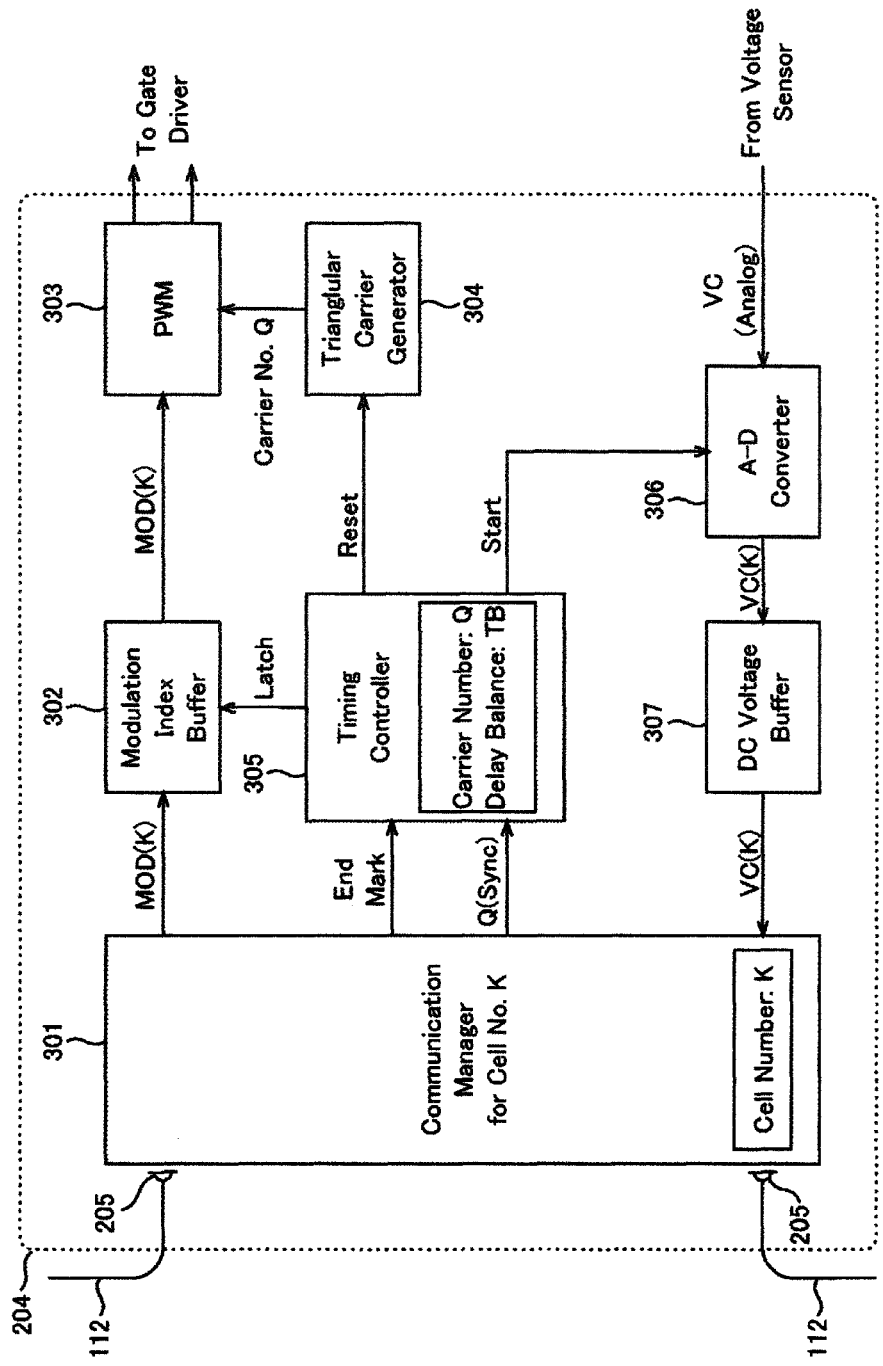
FIG. 3 shows a cell controller.

Hereinafter, the internal configuration of the cell controller 204 is described with reference to FIG. 3. FIG. 3 illustrates the internal configuration of the cell controller 204 belonging to the Kth cell, for example.

The cell controller 204 includes a communication manager 301, a modulation index buffer 302, a pulse width modulation (PWM) unit 303, a triangular waveform carrier generator 304, a timing controller 305, an analog to digital converter 306, and a DC voltage buffer 307.

The communication manager 301 stores into the modulation index buffer 302 a modulation index MOD(K) for its own cell received from the central controller 107 or from the adjacent cell via the optical transceiver 205. Where MOD(K) is a symbol representing the modulation index MOD of the Kth cell.

The pulse width modulation (PWM) unit 303 compares the modulation index MOD(K) stored in the modulation index buffer 302 with a triangular waveform carrier, which the triangular waveform carrier generator 304 generates, to generate the gate pulses for the switching devices 201 and 202.

The analog to digital converter 306 digitizes an analog signal of the DC capacitor voltage from the DC voltage sensor 207, and stores this information VC(K) into the DC voltage buffer 307. Where VC(K) is a symbol representing the DC capacitor voltage of the Kth cell.

The communication manager 301 transmits the information VC(K) about the DC capacitor voltage stored in the DC voltage buffer 307 to the central controller 107 or the adjacent cell via the optical transceiver 205.

The timing controller 305 controls the modulation index buffer 302, the pulse width modulation (PWM) unit 303, and the triangular waveform carrier generator 304.

Hereinafter, the necessity of the timing controller 305 is described.

Since each cell controller 204 of each cell 105 is supplied with a different clock source, a phase shift relationship at the initial stage of the triangular waveform carrier varies with time due to a slight error of the clock source and therefore an appropriate phase shift relationship cannot be maintained.

If the phase shift relationship between the triangular waveform carriers of the respective cells 105 cannot be maintained, an excessive harmonic component will be contained in a voltage between the point U and the point V of the power conversion device 103, a voltage between the point V and the point W, or a voltage between the point W and the point U. This causes a problem that an excessive harmonic component is contained in the arm currents IUH, IVH, IWH, IUL, IVL, or IWL or in the system currents IU, IV, or IW.

Accordingly, a unit for appropriately maintaining the phase shift relationship between the triangular waveform carriers is needed.

Since the optical fiber cables are daisy-chain connected in this example, there is a delay time until a certain cell controller 204 transmits a signal to other cell controller 204 adjacent thereto.

Since all the cells 105 are daisy-chain connected using the optical fiber cables, in the cell 105 far away from the central controller 107 the delay in signal transmission between cells will accumulate. Accordingly, a delay time until the control signal is transmitted from the central controller 107 to each cell 105 differs for each cell.

Accordingly, it is important to maintain the phase shift relationship of the triangular waveform carrier by including the timing controller 305 and also secure a balance in the delay time, which differs for each cell due to the daisy chain connection. The detailed operation of the timing controller 305 is described later.

Now, the cell number and the carrier number are defined. The cell number and the carrier number are information which the cell controller 204 of each cell 105 stores therein.

The cell number is the order of the daisy chain connection made by the optical fiber cables 111-114, from the central controller 107 to the relevant cell 105. The cell 105 whose cell number is k will be referred to as the Kth cell. The Kth cell is the Kth to receive information from the central controller 107.

The carrier number is a phase shift number of the triangular waveform carrier of the relevant cell 105 in a certain converter arm 104.

The cell 105 whose carrier number is Q generates a gate pulse based on a triangular waveform carrier whose phase is shifted by $N\times(Q-1)/360°$ relative to a reference phase. A triangular waveform carrier whose carrier number is Q will be referred to as the Qth carrier.

Hereinafter, a transmission method between the central controller 107 and each cell 105 in this example and the operation of each cell controller 204 are described with reference to FIG. 4 and FIG. 5.

The central controller 107 transmits an optical serial signal frame from one of two optical transceivers 110 at a substantially constant cycle (control cycle).

FIG. 4 is a view illustrating the optical serial signal frame 401 which the central controller 107 transmits and the operation of the Kth cell which receives this frame. The examples of the information included in the optical serial signal frame 401 include a signal start mark 402, a synchronization carrier number 403, a cell number 404, a modulation index 405 of each cell, and dummy information about the DC capacitor voltage of each cell or actual DC capacitor voltage information 406, and a signal end mark 407.

Other than these information, a parity, a checksum, a cyclic redundancy check (CRC), and the like may be included, however, in this example, the optical serial signal frame 401 which does not include the checksum and CRC is illustrated as a simple example.

The Kth cell compares the synchronization carrier number 403, i.e., Q(Sync), received from the K-first cell with its own carrier number Q. As shown in FIG. 5, if the synchronization carrier numbers Q(Sync) and Q are equal, its own triangular waveform carrier is forcibly reset to a certain value.

Moreover, the Kth cell extracts the modulation index 405, i.e., MOD(K), for its own by referring to the cell number 404 from a received optical serial signal frame, and stores the same into the modulation index buffer 302.

Furthermore, the Kth cell replaces the DC capacitor voltage dummy information 406 for its own with the actual DC capacitor voltage information VC(K) to generate a new optical serial signal frame.

The Kth cell transmits a newly generated optical serial signal frame to the (K+1)th cell.

In this example, if the number of cells is N, an optical serial signal frame which the Nth cell transmitted is returned to the central controller 107.

The central controller obtains the DC capacitor voltage information of each cell included in the optical serial signal frame returned from the Nth cell.

Hereinafter, the operation of the timing controller 305 is described.

The timing controller 305 supplies a latch signal to the modulation index buffer 302 when a delay balancing time TB has elapsed from a time instant when the communication manager 301 received the signal end mark of the optical serial signal frame.

If the synchronization carrier number Q(Sync) equals to the carrier number Q of the cell to which the timing controller 305 belongs, the timing controller 305, when the delay balancing time TB has elapsed from a time instant when the communication manager 301 received the signal end mark of the optical serial signal frame, supplies a reset signal to the triangular waveform carrier generator 304 to forcibly reset the triangular waveform carrier to a certain value (FIG. 5).

Hereinafter, the delay balancing time TB is described.

The delay balancing time TB is a time for approximately equalizing a signal-transmission delay time from the central controller 107 to each cell 105, and has a different value for each cell.

In Embodiment 1, the optical serial signal transmitted from the central controller 107 passes through the N cells 105 and is again returned to the central controller 107.

Accordingly, the central controller 107 can measure a time (total delay time) TD for an optical serial signal to pass through N cells.

For example, during initialization of the central controller 107 and each cell controller, the central controller 107 can measure the total delay time TD using a test optical serial signal frame for delay time measurement, and transmit the digital value of TD to all the cells 105 via optical serial transmission.

Thus, all the cells 105 have as many pieces of information of the total delay time TD as the number of all the cells (N cells). Moreover, each cell has the information (cell number K) about what number-th cell the each cell is.

Here, if the delay balancing time of the Kth cell is denoted as TB(K), the signal transmission delay time from the central controller 107 to each cell 105 can be substantially equalized by giving TB(K) of Formula (1).

$$TB(K) = (1 - K/N) \times TD \quad (1)$$

In the above, a case has been described, where the optical serial signal frame from the central controller 107 is transmitted in one direction from the first cell to the Nth cell.

However, when the central controller includes two optical transceivers 110, it is also possible to simultaneously transmit the same optical serial signal frame in the opposite direction, i.e., from the Nth cell to the first cell.

Thus, the number of transmission paths for the same optical serial signal frame can be set to two and thus transmission path redundancy can be secured.

In the above, the control of the power conversion device 103 has been described, including a controller comprising the central controller 107 and each cell 105 daisy-chain connected using optical fiber cables.

Now, the voltage waveform which is applied to the optical fiber cables 111-114 when the power conversion device 103 is operated using the above-described control method is described, and the reason why a low-voltage optical fiber cable can be employed for the optical fiber cables 112, 113 is described.

Figure 6A:
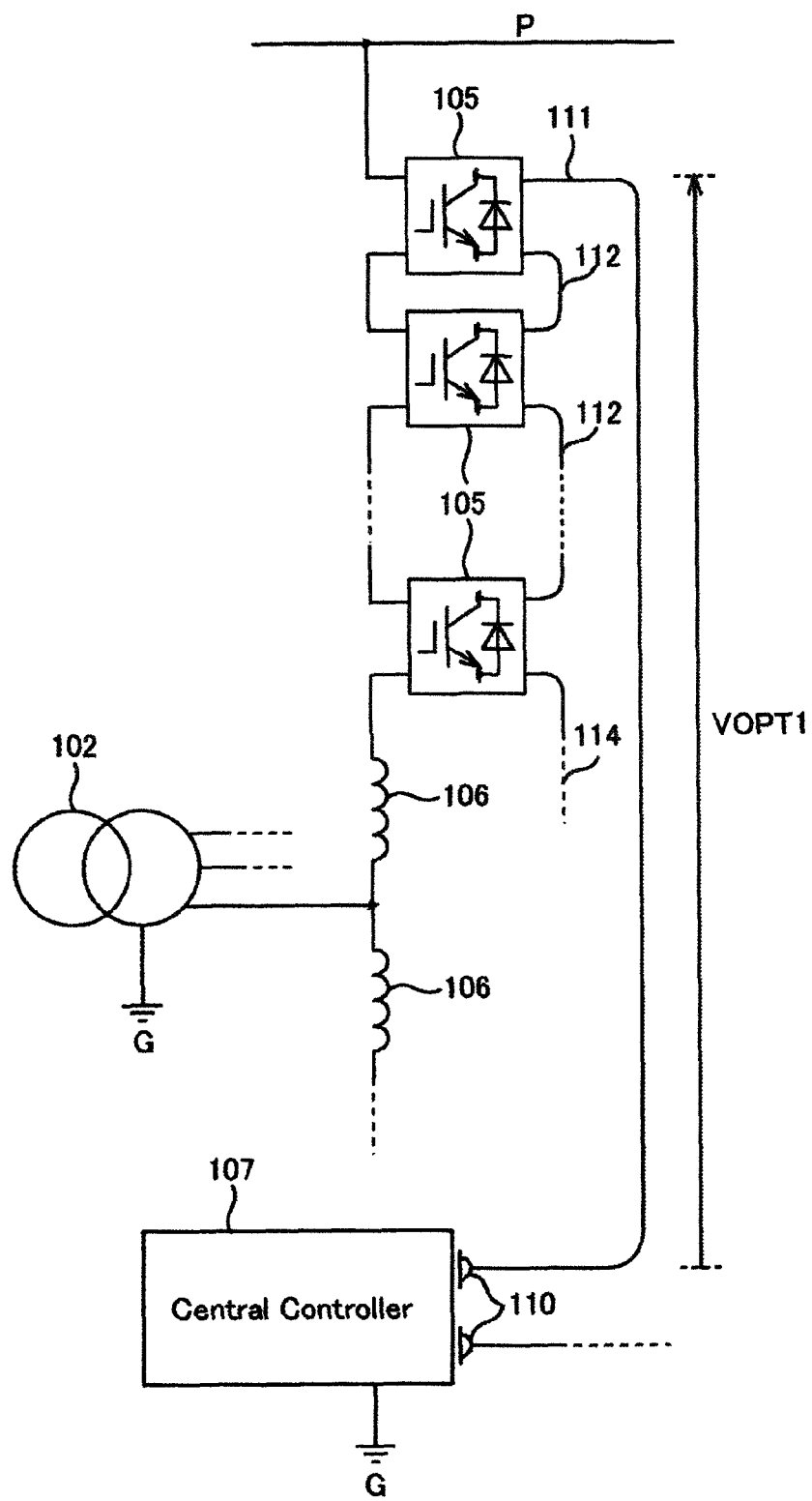
FIG. 6A shows an example of a high-voltage optical fiber cable.

FIG. 6A illustrates the high-voltage optical fiber cable 111 coupling the cell 105 coupled to the point P and the central controller 107, and the periphery thereof, which are extracted from FIG. 1.

The neutral point on the secondary side of the transformer 102 and the central controller 107 are grounded at the point G.

Figure 6B:
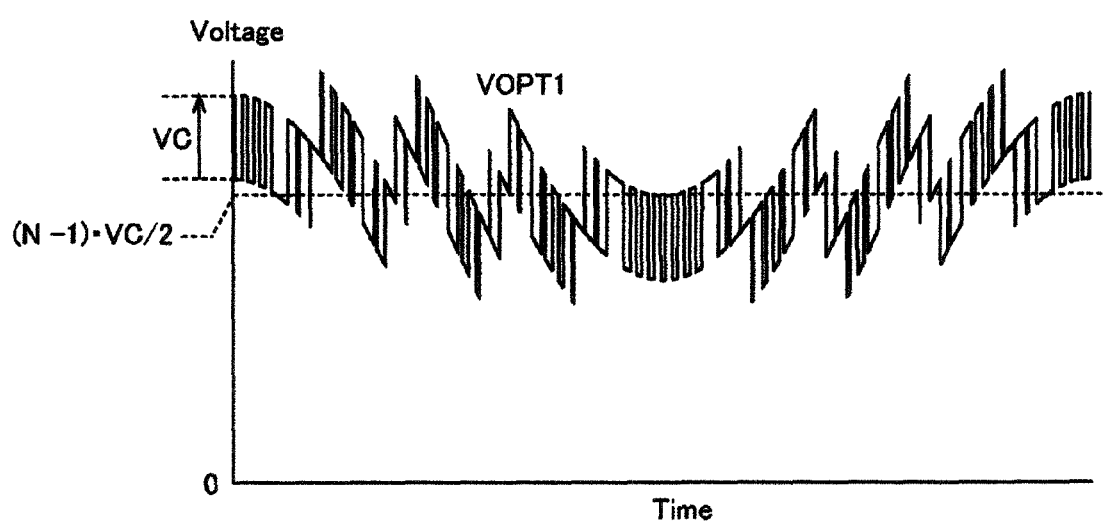
FIG. 6B shows an example of an applied voltage of a high-voltage optical fiber cable.

In this case, a voltage VOPT1 applied to the high-voltage optical fiber cable has a waveform substantially similar to that shown in FIG. 6B. However, in FIG. 6A and FIG. 6B, as an example, the number N of the cells 105 included in each converter arm 104 is assumed to be eight.

As shown in FIG. 6B, a voltage exceeding the DC capacitor voltage of one cell is applied to the high voltage optical fiber. If the number of the cells 105 included in one converter arm 104 is N, an average value of the voltage VOPT1 applied to the high-voltage optical fiber cable is expressed by $(N-1) \times VC/2$.

Figure 7A:
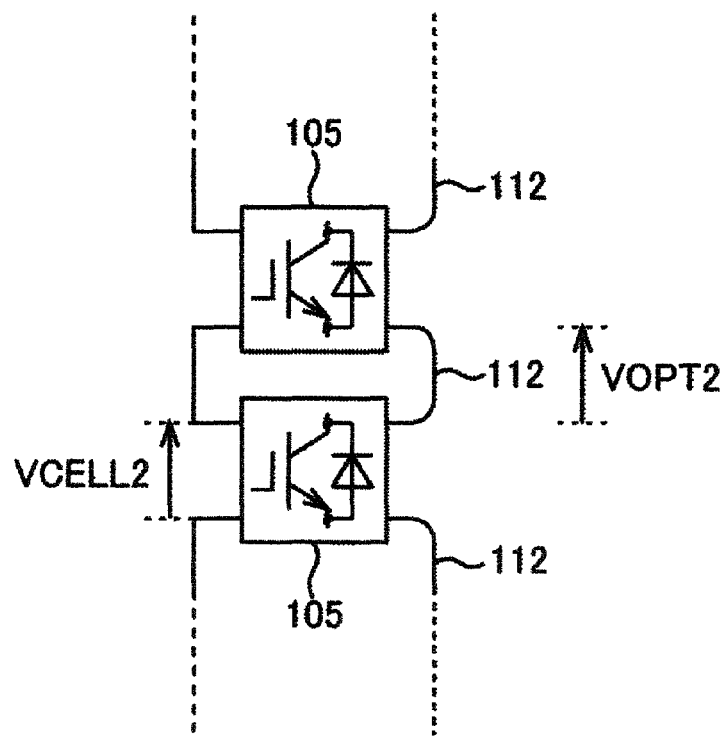
FIG. 7A shows an example of a low-voltage optical fiber cable coupling adjacent cells in the same converter arm.

FIG. 7A illustrates two cells 105 adjacent in the same converter arm, the low-voltage optical fiber cable 112 coupling the two adjacent cells, and the extracted periphery thereof, which are extracted from FIG. 1.

In FIG. 7A, a voltage VOPT2 applied to the low-voltage optical fiber cable 112 is a potential difference between the emitter terminal of the low-side switching device 202 of the lower cell 105 and the emitter terminal of the low-side switching device 202 of the upper cell 105.

Since two cells 105 are cascade-connected, the potential of the emitter terminal of the low-side switching device 202 of the upper cell 105 is equal to the potential of the collector terminal of the low-side switching device 202 of the lower cell 105.

Accordingly, the voltage VOPT2 applied to the low-voltage optical fiber cable 112 is substantially equal to an output voltage VCELL2 of the lower cell 105.

Figure 7B:
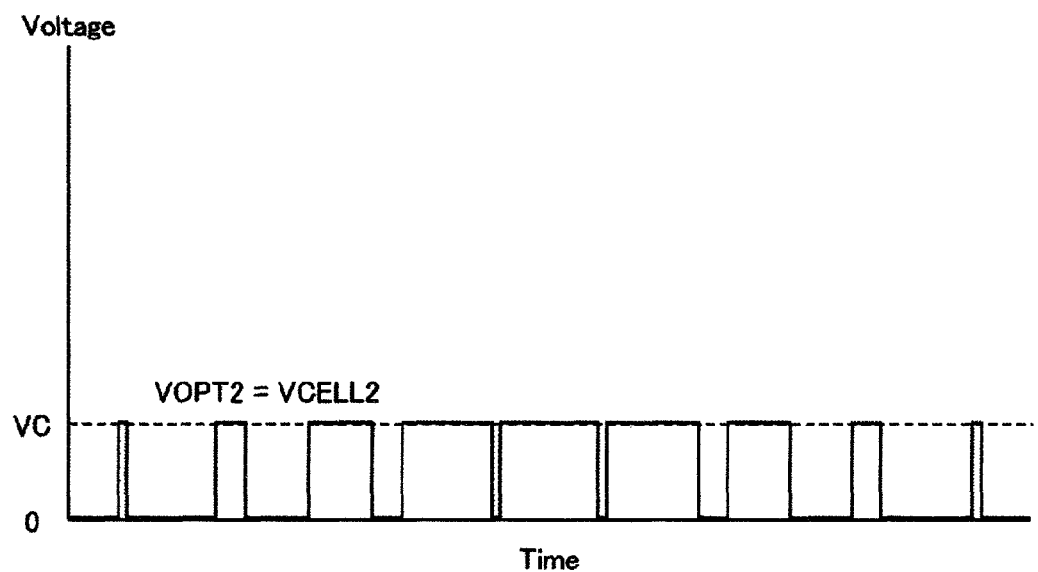
FIG. 7B shows an example of an applied voltage of the low-voltage optical fiber cable coupling adjacent cells in the same converter arm.

The waveform of VOPT2 is substantially the same as that shown in FIG. 7B. The amplitude of VOPT2 is substantially equal to VC.

The optical fiber cable 112 is sufficient if it has the output voltage amplitude of one cell i.e., a dielectric strength to withstand VC, and thus a low-voltage optical fiber cable can be employed.

Figure 8A:
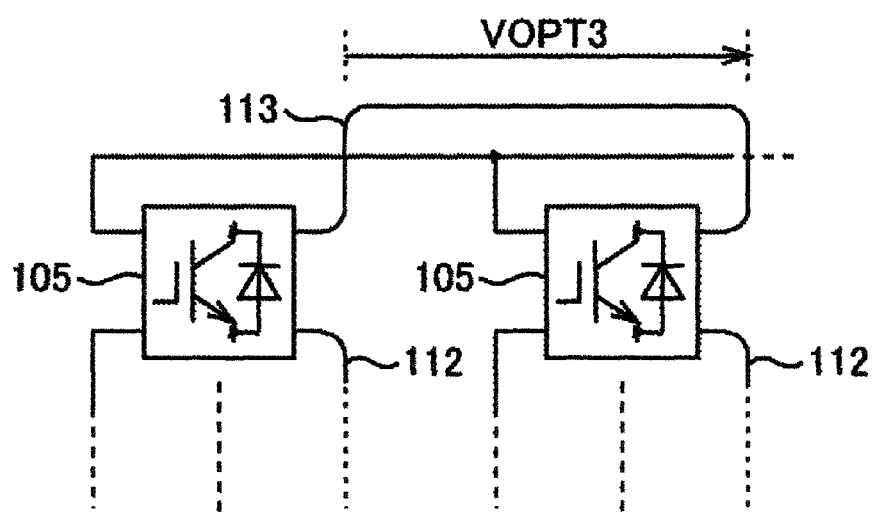
FIG. 8A shows an example of a low-voltage optical fiber cable coupling adjacent cells of other converter arm.

FIG. 8A illustrates the low-voltage optical fiber cable 113 coupling two cells coupled to the point P, the two cells 105 belonging to different converter arms 104, and the periphery thereof, which are extracted from FIG. 1.

Figure 8B:
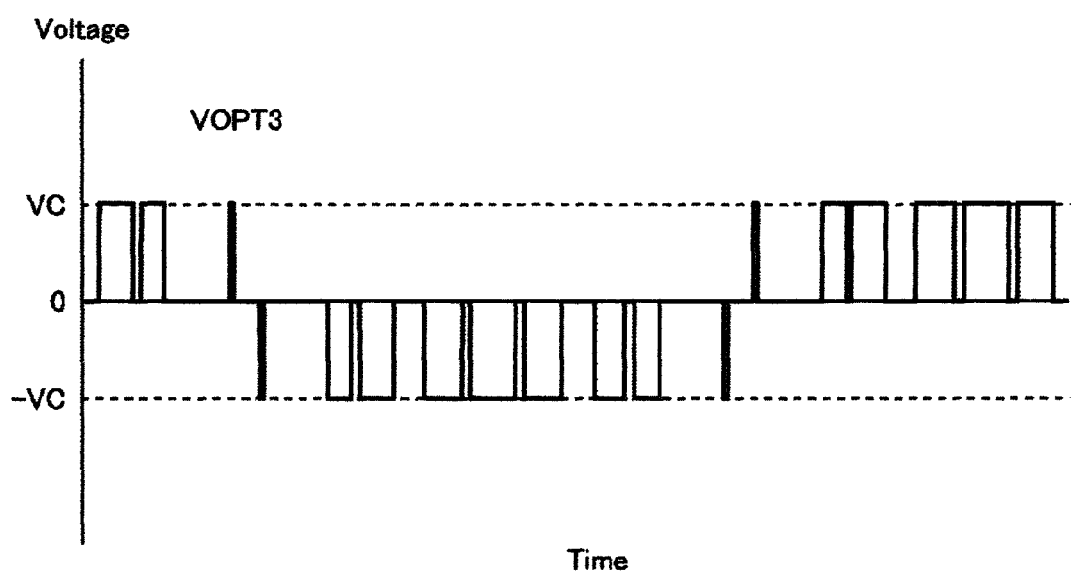
FIG. 8B shows an example of an applied voltage of the low-voltage optical fiber cable coupling adjacent cells of other converter arm.

The waveform of a voltage VOPT3 applied to the optical fiber cable 113 is substantially the same as that in FIG. 8B, and the amplitude thereof is substantially equal to VC.

The optical fiber cable 113 is sufficient if it has the output voltage amplitude of one cell i.e., a dielectric strength to withstand VC, and thus a low-voltage optical fiber cable can be employed.

Note that, in FIG. 1, also in two cells coupled to the point M, the two cells 105 belonging to different converter arms 104, the waveform applied to the optical fiber cable 113 coupling these two cells is substantially the same as that of FIG. 8B. Accordingly, a low-voltage optical fiber cable can be employed for the optical fiber cable 113.

The voltage applied to the optical fiber cable 114 coupling two cells belonging to different converter arms 104 belonging to the same phase is twice the DC capacitor voltage VC, at the maximum, under the normal operating condition.

However, when a system accident, such as an earth fault of one phase, occurs in the three-phase power system 101, the voltage applied to the optical fiber cable 114 may increase, and therefore a high-voltage optical fiber cable is employed for the optical fiber cable 114.

As described above, in this example, a low-voltage optical fiber cable can be employed for most of the optical fiber cables, and the number of high-voltage optical fiber cables can be reduced to five.

[Embodiment 2]

Next, a second embodiment of the present invention is described.

In Embodiment 1, all the cells are daisy-chain connected using optical fiber cables, while in Embodiment 2, each cell is daisy-chain connected using optical fiber cables for each phase.

In Embodiment 2, the number of high-voltage optical fiber cables will increase as compared with Embodiment 1.

However, since each converter arm 104 has the same configuration as that of Embodiment 1, a low-voltage optical fiber cable can be employed for most of the optical fiber cables 112 coupling the cells adjacent in each converter arm 104, as with Embodiment 1.

Moreover, as compared with Embodiment 1, Embodiment 2 provides an effect of reducing the communication time.

Figure 9:
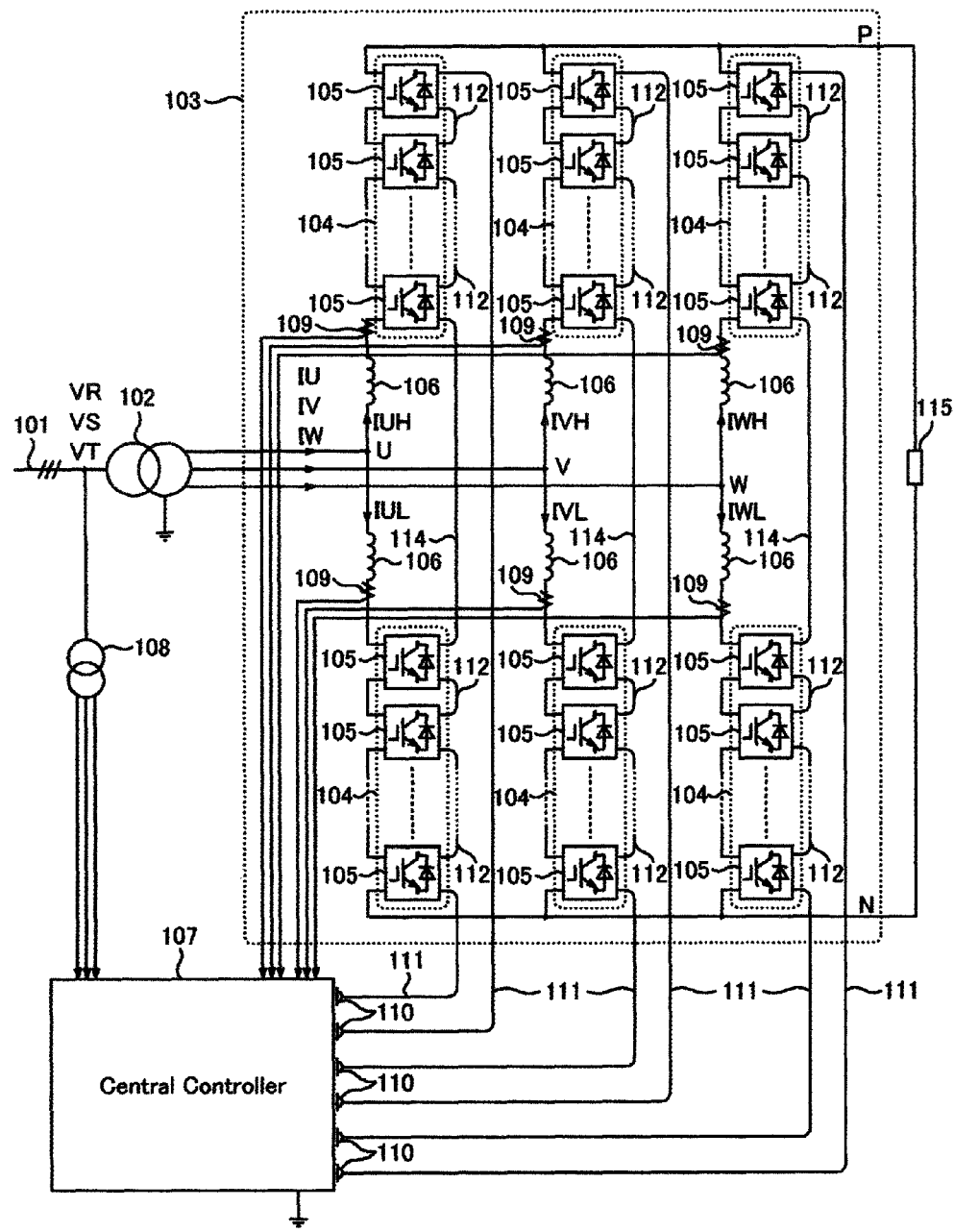
FIG. 9 shows an MMC, wherein for each phase, cells are daisy-chain connected using optical fiber cables.

FIG. 9 shows the overall configuration of Embodiment 2.

In Embodiment 2, the central controller 107 includes six optical transceivers 110, and the optical fiber cables are daisy-chain connected for each phase.

Thus, the number of cells communicating with one optical transceiver 110 is reduced from N of Embodiment 1 to N/3. Thus, the length of the optical serial signal frame shown in FIG. 4 also can be reduced to approximately ⅓ as compared with Embodiment 1. Thus, the communication time can be reduced as compared with Embodiment 1.

Then, the points other than the above-described ones are the same as that of Embodiment 1.

[Embodiment 3]

A third embodiment of the present invention is described.

Embodiment 3 is an example of the present invention applied to a cascade multilevel converter (CMC).

Embodiment 3 provides effects that the number of high-voltage optical fiber cables required in the prior art, the number being at least the same number as the number of cells, can be reduced to three and that a low-voltage optical fiber cable can be employed for most of the optical fiber cables.

Figure 10:
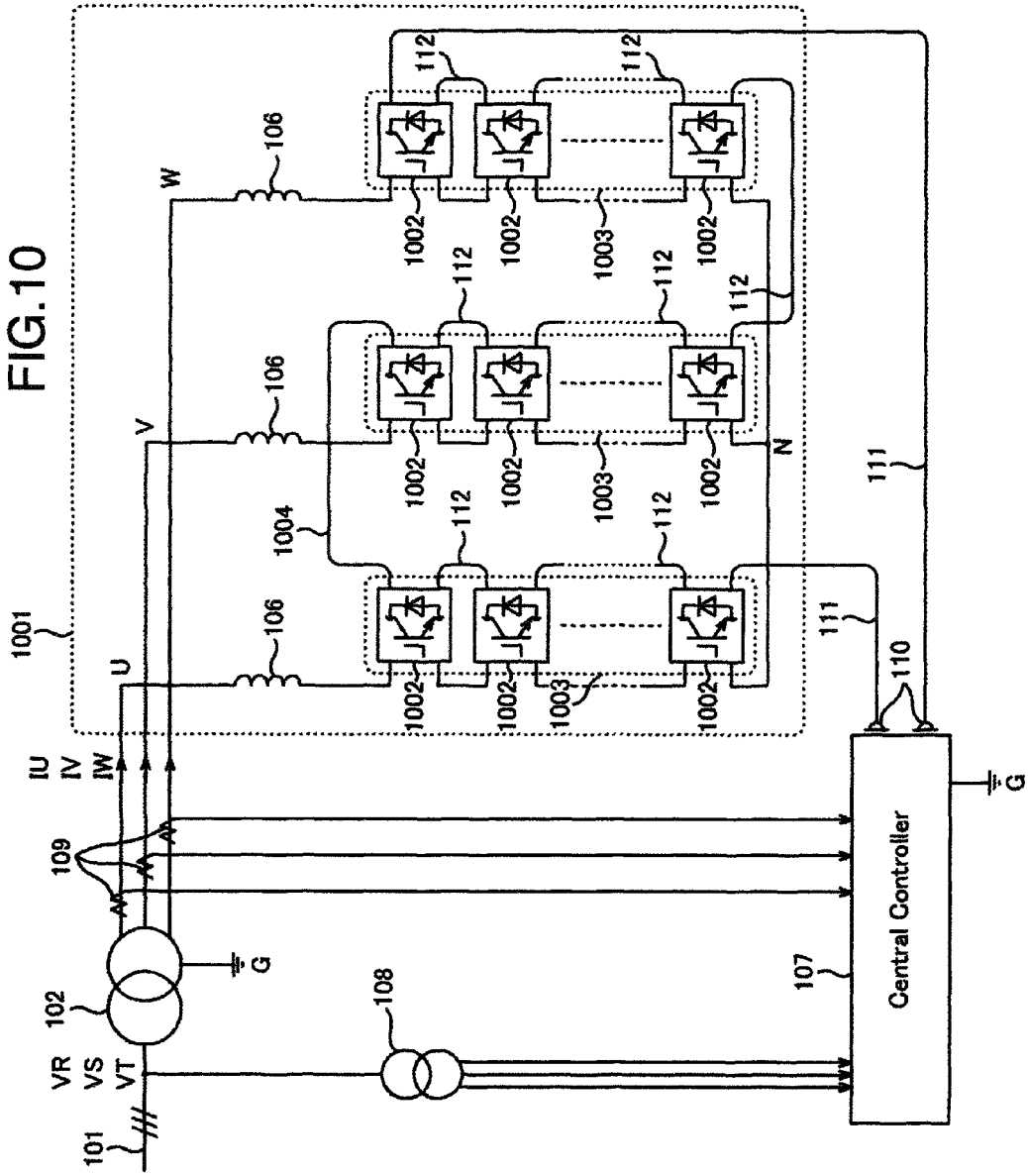
FIG. 10 shows a CMC, wherein all cells are daisy-chain connected using optical fiber cables.

FIG. 10 shows the overall configuration of Embodiment 3.

A power conversion device 1001 is interconnecting with a three-phase power system 101 via the transformer 102.

The difference from Embodiments 1, 2 is that the power conversion device 1001 is a cascade multilevel converter (CMC).

Figure 11:
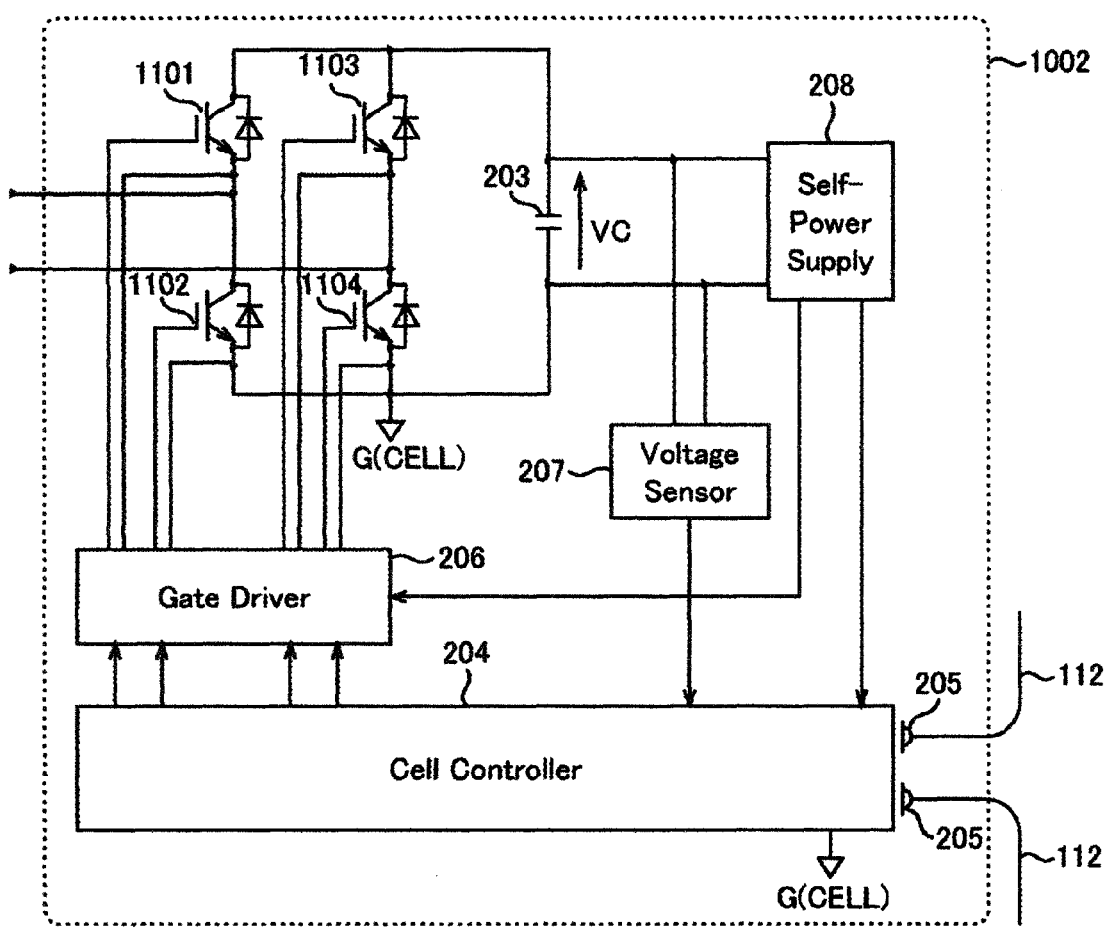
FIG. 11 shows a full-bridge cell.

Each cell of the power conversion device 1001 is a full-bridge circuit (FIG. 11). A circuit comprising a plurality of full-bridge cells 1002 cascade-connected will be referred to as a cluster 1003.

FIG. 11 shows the internal configuration of the full-bridge cell 1002.

The cell controller 204 generates a gate pulse for switching devices 1101-1104, and transmits the same to the gate driver 206.

The gate driver 206 applies an appropriate voltage to between the gate and emitter of the switching devices 1101 and 1102 to turn on or turn off the switching devices 1101 and 1102, respectively.

The boot-strap power supply 208 supplies power to the cell controller 204 and the gate driver 206.

In Embodiment 3, as with Embodiment 1, the central controller 107 includes two optical transceivers 110, and all the full-bridge cells 1002 are daisy-chain connected using optical fiber cables and communicate with the two optical transceivers 110.

Hereinafter, a voltage waveform applied to the optical fiber cable 112 coupling two full-bridge cells 1002 adjacent in the same cluster 1003 is shown, and the reason why a low-voltage optical fiber cable can be employed is described.

Figure 12A:
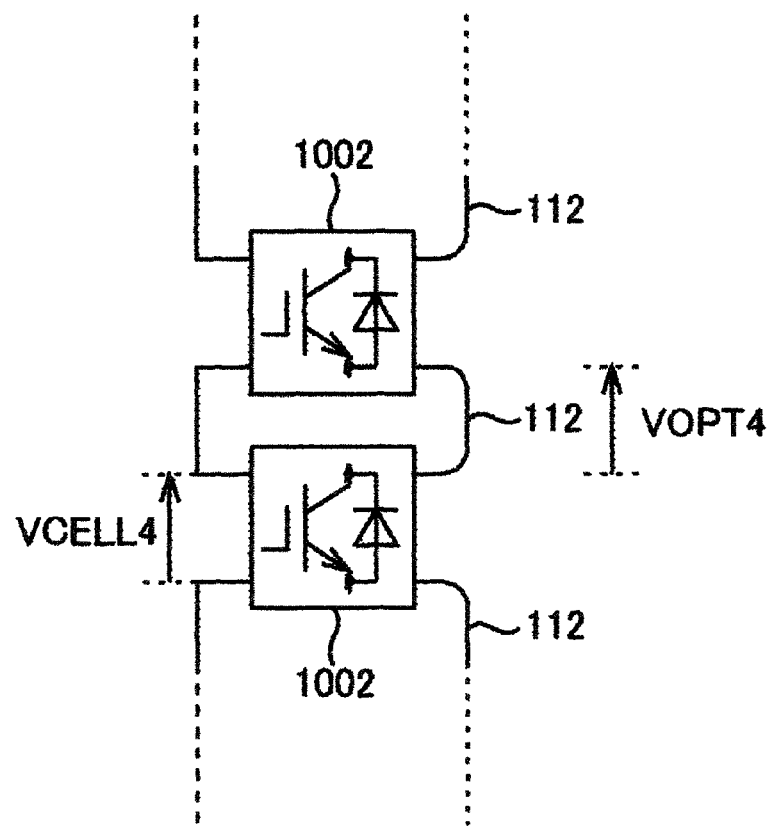
FIG. 12A shows an example of a low-voltage optical fiber cable coupling adjacent full-bridge cells in the same cluster.

FIG. 12A illustrates two full-bridge cells 1002 adjacent in the same cluster, the low-voltage optical fiber cable 112 coupling the two full-bridge cells 1002, and the periphery thereof, which are extracted from FIG. 10B.

Figure 12B:
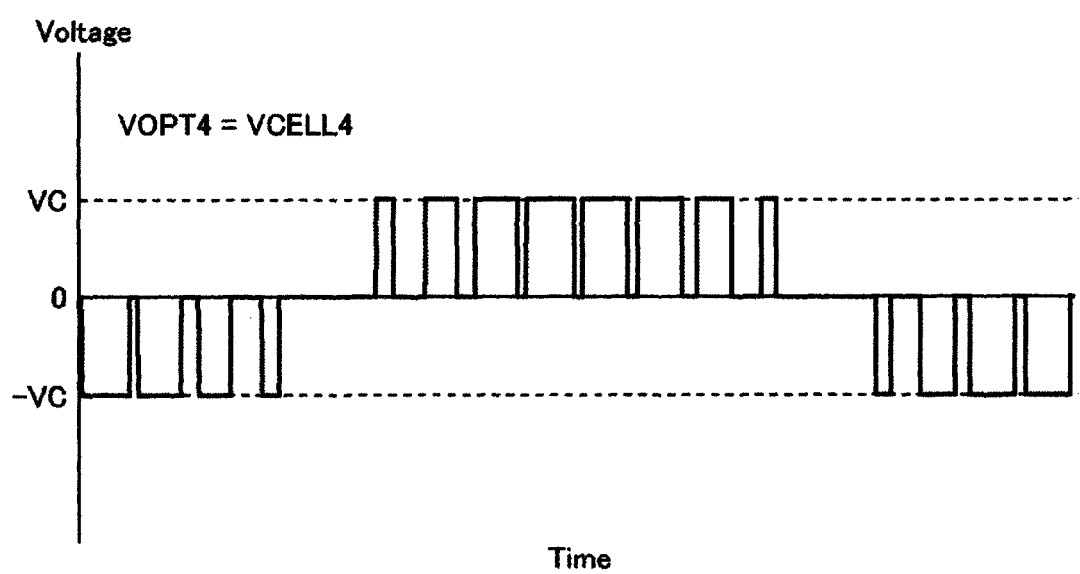
FIG. 12B shows an example of an applied voltage of a low-voltage optical fiber cable coupling adjacent full-bridge cells in the same cluster.

Moreover, FIG. 12B shows the waveform of a voltage VOPT4 applied to the low-voltage optical fiber cable 112.

In FIG. 12A, one leg of the upper full-bridge cell 1002 and one leg of the lower full-bridge cell 1002 are electrically coupled to each other (cascade-connected). The voltage VOPT4 applied to the optical fiber cable 112 is determined depending on the switching states of a total of four switching devices included in the two legs coupling the two full-bridge cells.

Whichever switching states the total of four switching devices take, the voltage appearing at VOPT4 possibly takes only either one of the DC capacitor voltage VC of the lower full-bridge cell 1002, the voltage VC obtained by inverting the polarity of the DC capacitor voltage VC of the upper full-bridge cell 1002, or zero. Accordingly, the amplitude of VOPT4 is VC.

Therefore, the optical fiber cable 112 is sufficient if it has the output voltage amplitude of one cell, i.e. a dielectric strength to withstand VC, and thus a low-voltage optical fiber cable can be employed.

Note that a voltage applied to the optical fiber cable 1004 coupling a U-phase cluster and a V-phase cluster to each other has an overlapped waveform of the line voltage on the secondary side of the transformer 102 and the output voltage of one full-bridge cell. Accordingly, a high voltage optical fiber is applied to the optical fiber cable 1004.

Embodiment 3 is substantially the same as Embodiment 1 except for the above-described points.

[Embodiment 4]

A fourth embodiment of the present invention is described.

In Embodiment 3, all the full-bridge cells are daisy-chain connected using optical fiber cables, while in Embodiment 4, each full-bridge cell is daisy-chain connected using optical fiber cables for each phase.

In Embodiment 4, the number of high-voltage optical fiber cables increases as compared with Embodiment 3.

However, since each cluster 1003 has the configuration as that of Embodiment 1, a low-voltage optical fiber cable can be employed for most of the optical fiber cables 112 coupling the cells adjacent in each converter arm 104, as with Embodiment 1.

Moreover, as compared with Embodiment 3, Embodiment 4 provides an effect of reducing the communication time.

Figure 13:
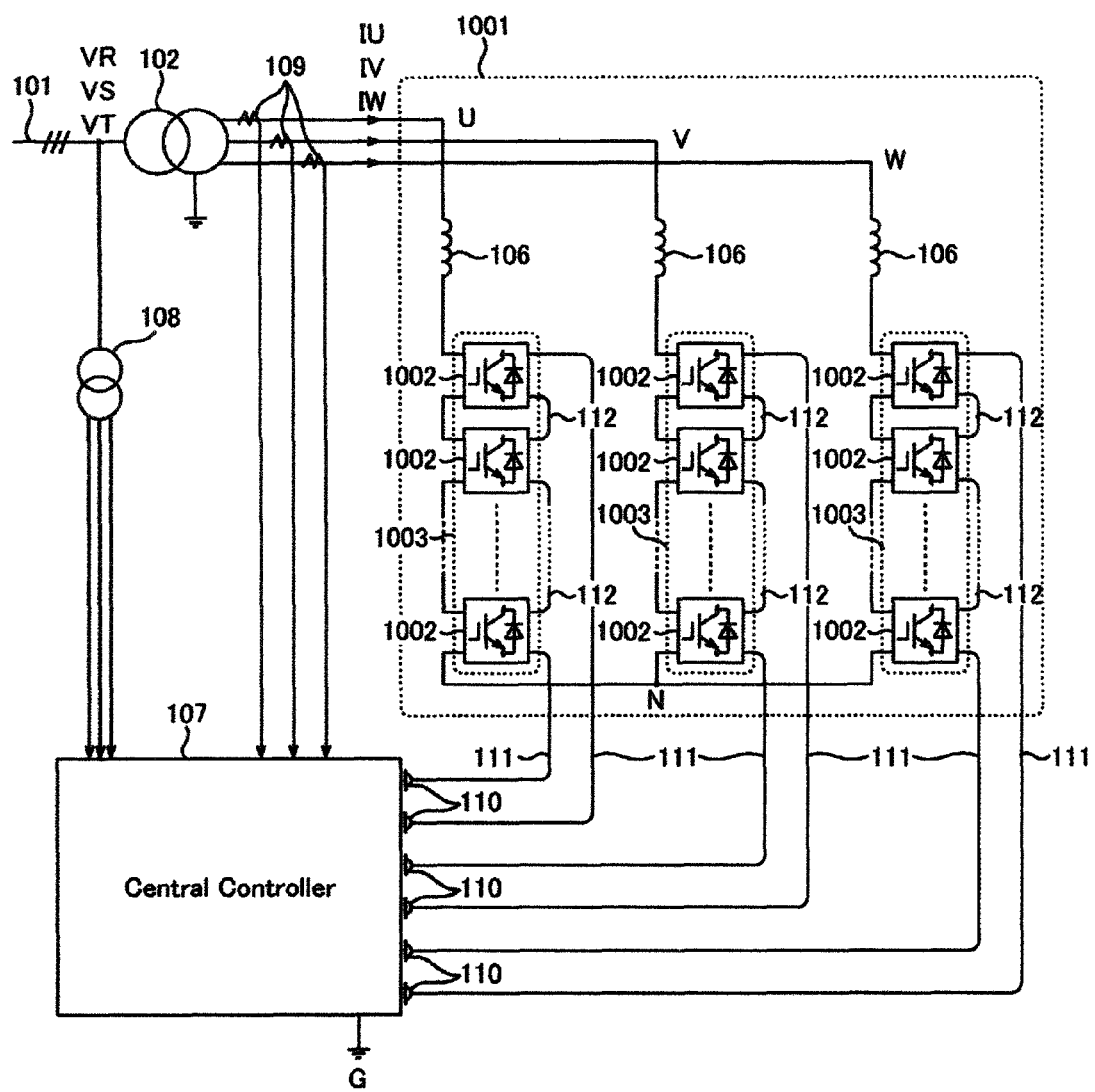
FIG. 13 shows a CMC, wherein for each phase, cells are daisy-chain connected using optical fiber cables.

FIG. 13 shows the overall configuration of a power converter of Embodiment 4.

In Embodiment 4, as with Embodiment 2, the central controller includes six optical transceivers 110, and the optical fiber cables are daisy-chain connected for each phase.

The number of cells communicating with each optical transceiver 110 is reduced from N of Embodiment 3 to N/3, and the length of the optical serial signal frame can be also reduced to ⅓ as compared with Embodiment 3.

Embodiment 4 has the overall configuration similar to that of Embodiment 3 except for the above-described points. The above description has been made with regard to the examples, however the present invention is not limited thereto, and it is clear to those skilled in the art that various kinds of changes and modifications can be made within the spirit of the present invention and the scope of the attached claims.

INDUSTRIAL APPLICABILITY

The power conversion device of the present invention can be used for a DC load supplying/receiving an AC power to/from an AC system, a DC link of a motor drive inverter, a DC power supply, and the like.

REFERENCE SIGNS LIST 101 three-phase power system
102 transformer
103, 1001 power conversion device
104 converter arm
105 cell
106 reactor
107 central controller
108 AC voltage sensor
109 current sensor
110, 205 optical transceiver
111-114, 1004 optical fiber cable
115 load device
201, 1101, 1103 high-side switching device
202 1102, 1104 low-side switching element
203 DC capacitor
204 cell controller
206 gate driver
207 DC voltage sensor
208 boot-strap power supply
301 communication manager
302 modulation index buffer
303 PWM unit
304 triangular waveform carrier generator
305 timing controller
306 analog to digital converter
307 DC voltage buffer
401 optical serial signal frame
402 signal start mark
403 synchronization carrier number
404 cell number
405 modulation index
406 DC capacitor voltage information or DC capacitor voltage dummy information
407 signal end mark
1002 full-bridge cell
1003 cluster

The invention claimed is:

1. A power conversion device comprising a plurality of cascade-connected cells, wherein
a controller of the power conversion device comprises a central controller, a cell controller with the same potential as each cell, the cell controller being installed in the vicinity of each cell, and wherein
the central controller and each cell controller are daisy-chained using an optical fiber cable.

2. The power conversion device according to claim 1, wherein the cell comprises:
a main circuit comprising an on-off control switching device and a DC capacitor;
a DC voltage sensor detecting a voltage of the DC capacitor;
the cell controller having a function to receive a signal from the central controller and generate a gate pulse of the on-off control switching device and a function to transmit a signal from the DC voltage sensor to the central controller;
a gate driver receiving the gate pulse from the cell controller and turning on/off the on-off control switching device; and
a boot-strap power supply supplying power to the cell controller and the gate driver.

3. The power conversion device according to claim 1, wherein the optical fiber cable coupling the central controller and the cell controller to each other is an optical fiber cable having a dielectric strength against a sum of the voltages at output terminals of a plurality of cells.

4. The power conversion device according to claim 1, wherein the optical fiber cable coupling the cell controllers of cascade-connected two cells is an optical fiber cable having a dielectric strength against the output voltage of one cell.

5. The power conversion device according to claim 4, wherein the optical fiber cable coupling the cell controllers of the cascade-connected two cells is supported by an electrical wiring between the cascade-connected two cells or by a member of the same potential as that of the electrical wiring.

6. The power conversion device according to claim 1, wherein the optical fiber cable coupling cell controllers of two cells, in which one of two terminals of the output terminal of one of the two cells and one of two terminals of the output terminal of the other cell are electrically coupled to each other, is an optical fiber cable having a dielectric strength against the output voltage of one cell.

7. The power conversion device according to claim 6, wherein the optical fiber cable coupling cell controllers of two cells, in which one of two terminals of the output terminal of one of the two cells and one of two terminals of the output terminal of the other cell are electrically coupled to each other, is supported by an electric wiring cascade-connecting the two cells or by a member of the same potential as that of the electric wiring.

8. The power conversion device according to claim 1, wherein the cell controller comprises:
a communication manager managing communication with the central controller;
a modulation index buffer storing a modulation index for a main circuit therein, the modulation index being received from the central controller;
a digital to analog converter converting an analog signal from the DC voltage sensor into a digital signal;
a DC voltage buffer storing the digital signal therein;
a triangular waveform carrier generator generating a triangular waveform carrier; and
a gate pulse generator comparing the triangular waveform carrier with the modulation index stored in the modulation index buffer and generating a gate pulse supplied to the on-off control switching device.

9. The power conversion device according to claim 1, wherein the cell controller includes a timing controller issuing an operation timing command to the modulation index buffer, the triangular waveform carrier generator, and the gate pulse generator.

10. The power conversion device according to claim 1, wherein the central controller transmits an optical serial signal frame comprising: a signal start mark; a synchronization carrier number; a series of signals comprising a modulation index signal with a cell number and a DC capacitor voltage dummy signal; and a signal end mark, at a substantially constant cycle.

11. The power conversion device according to claim 1, wherein the cell controller receives the synchronization carrier number of the optical serial signal frame which is received via other cell controller daisy-chained from the central controller, and wherein if the synchronization carrier number coincides with its own carrier number, then the cell controller, when it has received the signal end mark included in the optical serial signal frame, resets the triangular waveform carrier generator via the timing controller.

12. The power conversion device according to claim 1, wherein the cell controller receives the modulation index signal with a cell number included in the optical serial signal frame which is received via other cell controller daisy-chained from the central controller, and wherein if the attached cell number coincides with its own cell number, the cell controller stores the received modulation index signal into the modulation index buffer.

13. The power conversion device according to claim 1, wherein the cell controller receives the DC capacitor voltage dummy signal with a cell number included in the optical serial signal frame which is received via other cell controller daisy-chained from the central controller, and wherein if the attached cell number coincides with its own cell number, the cell controller replaces the received DC capacitor voltage dummy signal with a signal stored in the DC voltage buffer.

* * * * *